United States Patent [19]

Weiss et al.

[11] Patent Number: 4,895,051
[45] Date of Patent: Jan. 23, 1990

[54] CLUTCH WITH TWO PRESSURE PLATES AND ONE STOP

[75] Inventors: Heinz Weiss, Bensheim; Herbert Gelb, Hockenheim, both of Fed. Rep. of Germany

[73] Assignee: Deere & Company, Moline, Ill.

[21] Appl. No.: 232,824

[22] Filed: Aug. 15, 1988

[30] Foreign Application Priority Data

Aug. 18, 1987 [DE] Fed. Rep. of Germany ....... 3727510

[51] Int. Cl.⁴ .......................................... F16H 1/44.5
[52] U.S. Cl. .................................... 74/711; 182/84 B
[58] Field of Search ............... 192/84 B, 54, 70.23, 192/114 R; 74/711, 710.5

[56] References Cited

U.S. PATENT DOCUMENTS

| | | | |
|---|---|---|---|
| 3,071,226 | 1/1963 | Fujita | 192/84 B |
| 3,096,863 | 7/1963 | Shefke | 192/84 B X |
| 3,180,469 | 4/1965 | Wiedmann et al. | 192/84 B X |
| 3,252,553 | 5/1966 | Peterson | 192/54 X |
| 3,331,481 | 7/1967 | Wrensch | 192/84 B X |
| 3,833,102 | 9/1974 | Stähle | 192/84 B X |
| 3,875,805 | 4/1975 | Tovlier | 192/114 R X |
| 4,192,411 | 3/1980 | Fogelbert | 192/36 |
| 4,249,429 | 2/1981 | Denning | 74/710.5 X |
| 4,263,824 | 4/1981 | Mueller | 74/711 |
| 4,400,996 | 8/1983 | Schou . | |
| 4,679,463 | 7/1987 | Ozaki et al. | 74/711 |
| 4,694,943 | 9/1987 | Petrak | 192/35 |
| 4,733,743 | 3/1988 | Weiss et al. . | |

FOREIGN PATENT DOCUMENTS 3308398 9/1984 Fed. Rep. of Germany .

Primary Examiner—Dwight G. Diehl

[57] ABSTRACT

A clutch has two pressure plates that are provided with conical teeth facing one another on opposing faces of the pressure plates. The conical teeth resolve relative rotation between the pressure plates into axial force pushing the plates apart, thereby to press the clutch disks together to engage the clutch. A selectively engageable stop is provided on one of the pressure plates to permit limited, unlimited, or no relative rotation between the pressure plates. The stop is controlled depending on parameters such as steering angle and direction of travel. Two such clutches can be applied to the differential of a vehicle drive.

15 Claims, 3 Drawing Sheets

CLUTCH WITH TWO PRESSURE PLATES AND ONE STOP

BACKGROUND OF THE INVENTION

1. Field of the Invention

The present invention concerns a clutch with two pressure plates and one stop, particularly for use on either side of the differential of a vehicle drive.

2. Description of the Related Art

U.S. Pat. No. 4,400,996 (Schou) teaches a limited slip differential having two clutches which transmit driving power to each driving wheel, or interrupt power to an overrunning wheel, depending on the transmitted torque. Each clutch contains two pressure plates that can move tangentially relative to each other and which are forced axially apart as a result of any such tangential motion, thereby to engage the clutch to drive the wheel. The two pressure plates are connected by a stop ring so that in forward or reverse travel with unequal rotational speeds, e.g., during turning, the clutch of the overrunning wheel will disengage and will not act as a brake.

The Schou clutch has the disadvantage that its operation requires the stop ring to engage both axially moveable pressure plates. This in turn requires a differential with specific installed dimensions between the two clutches. In addition, this type of stop ring means the clutches must be used in pairs, and can accommodate only a limited number of operating conditions.

The problem underlying the present invention is seen as that of designing a clutch which can be installed directly in the drive line of the driven wheel, without integration into a differential between the wheels. It should operate in the same manner as the known clutch, but, if possible, it should also be able to operate under additional operating conditions.

SUMMARY OF THE INVENTION

These and other objects have been accomplished according to the present invention by providing a selectively disengageable stop Each clutch has two pressure plates which can move tangentially relatively to one another. Each plate has a series of slanted teeth facing the other plate. When the two plates move tangentially relative to one another, the teeth engage and force the two plates axially apart. This in turn presses the driven plate against a series of clutch disks or the like to engage the clutch. A stop lug is provided on one of the clutch plates and a retractable fork for engaging the stop lug is provided on the other plate. The retractable fork can be solenoid-controlled or can be controlled by hydraulic, pneumatic, or other means. When extended, the fork engages the stop lug to prevent relative rotation between the plates. When the fork is withdrawn, the stop lug can move past it, and relative rotation between the plates is allowed.

A clutch of this type preferably is provided for each component to be driven, e.g., on either side of a differential between two wheels. Each clutch includes a stop which can operate in the same manner as the Schou stop ring, but which also can be controlled independently. For example, it can be engaged or disengaged depending on the advance of an overrunning outer wheel during cornering. It also can be controlled depending on the steering angle or direction-of-travel when applied in the wheel drive gear box of the motor vehicle. While the two stops are physically separated, they are connected by ground contract and by the control circuit which evaluates parameters and controls engagement of the stops.

A clutch of this type may also be used in other applications, e.g., in drives for conveyor rollers, for blowers, or to the engine output drive. In addition, with this clutch design, it is not necessary to employ two clutches arranged symmetrically to each other as in the Schou clutch. It is equally possible to use an odd number of clutches.

BRIEF DESCRIPTION OF THE DRAWINGS

A preferred embodiment of the present invention will be described in greater detail with reference to the following drawings.

DETAILED DESCRIPTION OF THE PREFERRED EMBODIMENTS

The clutch according to the present invention preferably is applied in the front wheel drive of an agricultural tractor, as described in U.S. Pat. No. 4,733,743 (Weiss et al.), which is incorporated herein by reference. That tractor has continuously driven rear wheels and selectively engageable front wheels. The clutch according to the present invention is used advantageously in the driveline for the front wheels, as described below.

Figure 1:
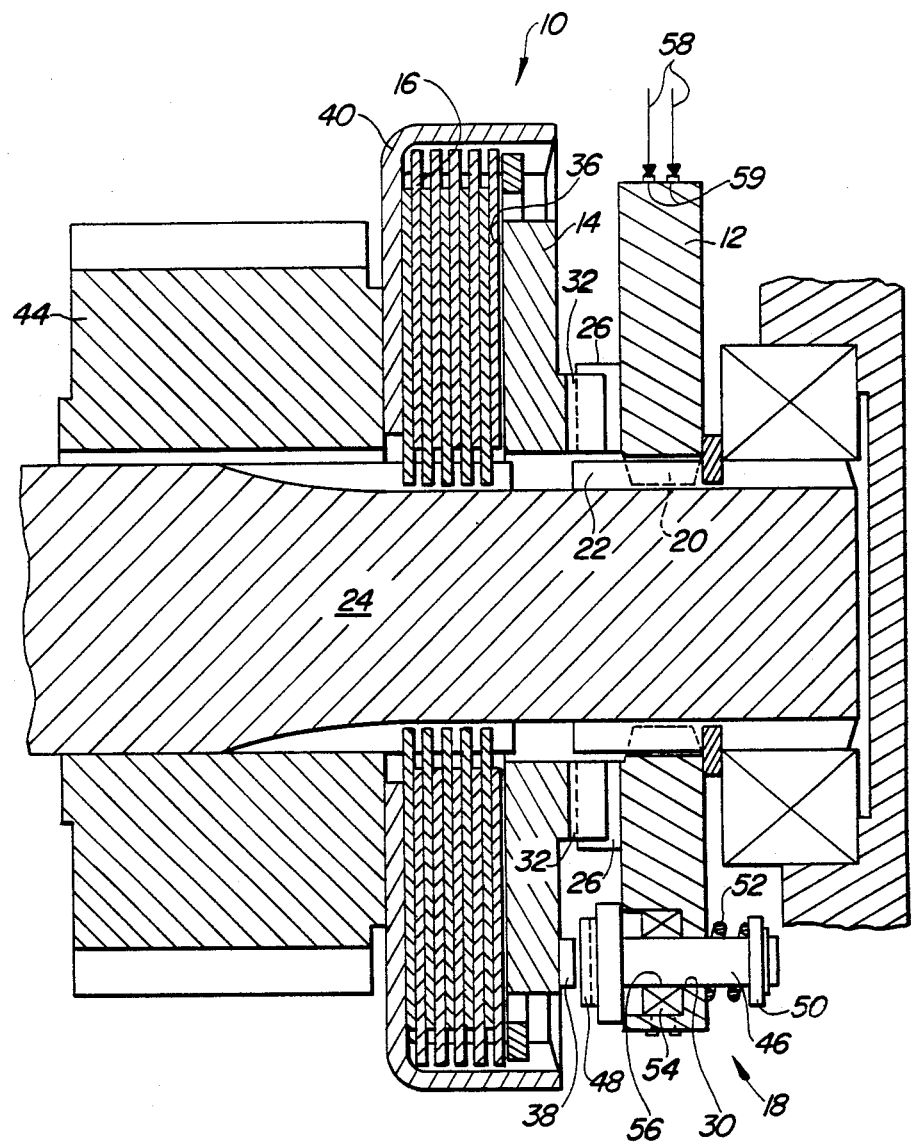
FIG. 1 illustrates a preferred embodiment of a clutch according to the present invention.

Referring to FIG. 1, a clutch 10 has a first pressure plate 12, a second pressure plate 14, a clutch disk package 16, and a stop 18.

Figure 2:
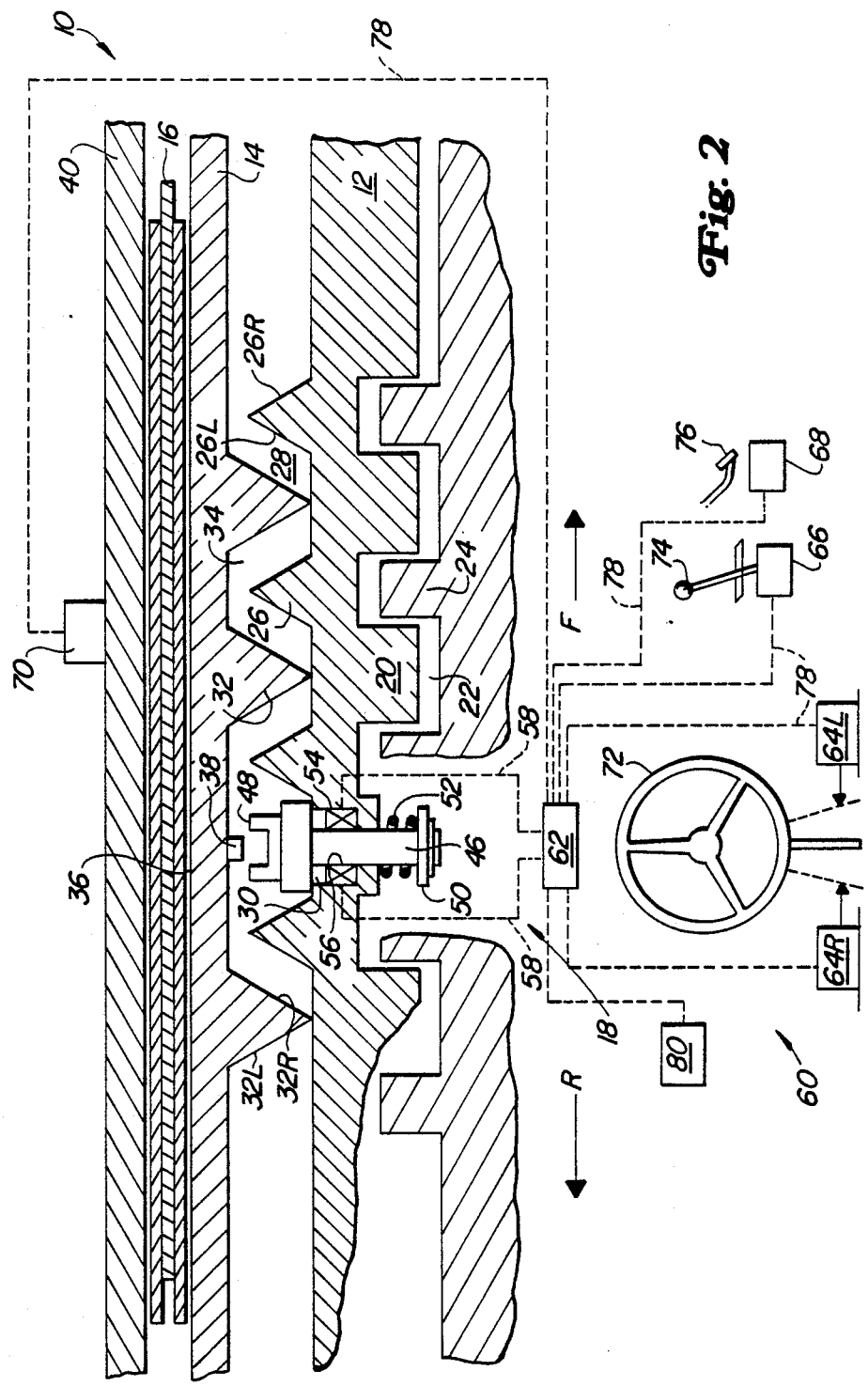
FIG. 2 is a schematic view of the clutch of FIG. 1, cut and spread out in a line.

As best seen in FIG. 2, the first pressure plate 12 is provided with splines 20 on its central bore which engage corresponding recesses 22 in the rotating part 24, shown here as a shaft. Alternatively, the first pressure plate 12 can be equipped with splines on its outer periphery, e.g., to engage a rotating bell housing. These splines 20 and the recesses 22 may be arranged to engage radially, as shown in FIG. 1, or may engage axially. Again as best seen in FIG. 2, conical or contoured teeth 26 are provided on pressure plate 12 facing towards the second pressure plate 14. The teeth 26 are provided with right and left flanks 26R, 26L in the sense of FIG. 2. Tooth spaces 20 are provided between the teeth 26. The tangential extent of each tooth space 28 is greater than the extent of the teeth 26. A hole 30 is provided in the first pressure plate 12 for the mounting of stop 18.

The second pressure plate 14 also is equipped with teeth 32 and tooth spaces 34 which are a mirror image of those of the first pressure plate 12, but offset tangentially therefrom. On the side of the second pressure plate 14 opposite the teeth 32, a planar contact surface 36 is machined, with which the first disk in the disk package 16 can be brought into contact. There is no positive connection between the second pressure plate 14 and the rotating shaft 24. A stop lug 38 is provided in the tooth space 34 opposite the hole 30. The stop lug 38 may be attached to the second pressure plate 14 by a threaded connection, a press fit, or any other technique, including being formed as part of the plate.

The clutch disk package 16 includes disks provided with teeth on their inner diameters alternating with separators splined on their outer diameters (or vice-versa), in the known practice. The disks or separators with external teeth engage the support cup 40, while the disks or separators with internal teeth engage shaft 24. The support cup 40, is fixed axially, so that all the disks and separators in the disk package 16 can be pressed together against the support cup 40 as further described below. The last disk or separator in the disk package 16 is in contact with the support cup 40 which is mounted to a driven component 44.

The stop 18 includes a solenoid-controlled plunger 46 which has a fork 48 formed at its end region near the stop lug 38. The other end region of the plunger 46 is provided with a head 50, e.g., a washer and a snap ring. The plunger 46 is surrounded on one part of its length by a spring 52 and on another part of its length by a magnet 54 that can be controlled electrically. The inside diameter 56 of the magnet 54 is smaller than the outside diameter of the fork 48. The spring 52 is installed between the head 50 and the face of the first pressure plate 12, and pre-loaded to push the plunger 46 away from the stop lug 38, so that the fork 48 is brought into contact with the magnet 54 or the first pressure plate 12 in the corresponding tooth space 28.

The magnet 54 is installed in the hole 30 by a threaded connection, adhesive, or other means, and is controlled by control lines 58, which transmit control impulses through slip rings 59 (see FIG. 1) to the magnet 54. The control is effected by the presence or absence of a current supply to the magnet 54.

Figure 4:
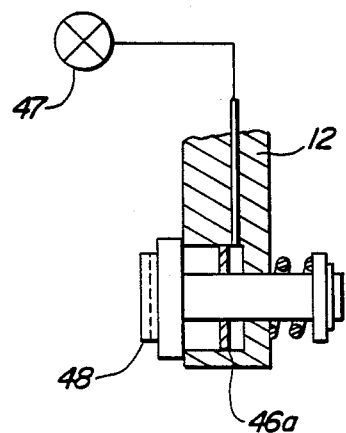
FIG. 4 is a schematic illustration of an alternative embodiment of the stop illustrated in FIG. 1.

While the plunger 46 has been shown as directly solenoid controlled, it alternatively can be provided with a piston 46a and then controlled using an electromagnetic valve 47 (see FIG. 4) to control a supply of compressed air or oil pressure to the chamber behind the piston 46a, thereby to move the plunger 46 axially.

Since plunger 46 is attached to the pressure plate 12, which rotates during operation, a balancing weight may be attached diametrically opposite the plunger 46, if required, to avoid any imbalance. The stop 18 may be activated or deactivated by means of a control circuit 60, illustrated in FIG. 2. The control circuit 60 preferably is configured on an electronic basis, though it is also possible to configure it on a hydraulic or pneumatic basis or in some combination of these.

The preferred control circuit 60 contains a control unit 62, steering angle sensors 64R for steering to the right and 64L for steering to the left, a sensor for the direction of travel 66, a brake sensor 68, a pressure sensor 70 and a main switch 80.

The control unit 62 contains internal logic circuits whose logical connections perform the operations described below, and preferably comprises a preprogrammed microprocessor. The control impulses supplied by the control unit 62 are transmitted over the control lines 58 to the magnet 54 of the stop 18 so as to properly control the latter.

The steering angle sensors 64R, 64L are attached to a steering component 72, which may be a steering wheel, a track rod, a steering arm, or similar component. The drawing shows a steering wheel for sake of simplicity. The design of the steering angle sensors 64R, 64L will determine whether a single steering angle sensor, capable of detecting both angles, is required, or two sensors, each of which covers steering deflection in one direction.

The travel direction sensor 66 preferably is attached to a shift lever 74, which controls forward or reverse travel direction. It may also be attached anywhere in the drive line or at the wheels.

The brake sensor 68 is attached either to the brake pedal 76 or to the brake lines or similar components, and determines whether or not the brake is being operated. Alternatively, a number of brake sensors 68 can be provided to distinguish between straight line braking and steering braking.

The pressure sensor 70 is installed in the area of the clutch 10, and determines whether an axial load is applied to the first or the second pressure plate 12 or 14, which would indicate that the corresponding wheel or driven component 40 is supplied with power.

In the preferred embodiment, the steering angle sensors 64R, 64L, the travel direction sensor 66, the brake sensor 68, and the pressure sensor 70 are configured as simple contact switches that either permit or block current flow.

The connection between the steering angle sensors 64R, 64L, the travel direction sensor 66, and the brake sensor 68 with the control 62 is made by control lines 78. The main switch 80 can interrupt all flow of power to the selectively driven wheels. Preferably, the main switch 80 is installed at an operator's platform (not shown) and can be operated manually.

Figure 3:
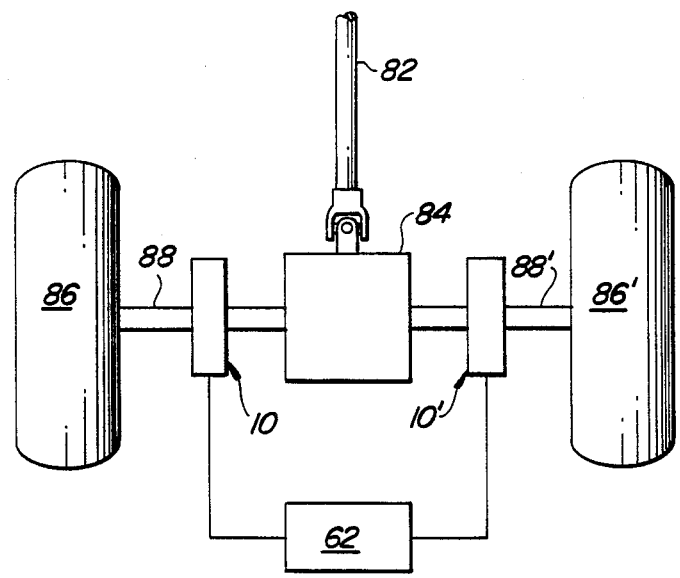
FIG. 3 is a schematic illustration of two of the clutches of FIG. 1 in the drive line of a vehicle.

A preferred layout for use of the present clutch with a differential of a vehicle is schematically illustrated in FIG. 3. A drive shaft 82 drives a differential 84 connected between two wheels 86, 86'. Clutches 10, 10' according to the present invention are positioned in the drive lines 88, 88' between the differential 84 and the wheels 86, 86'. The clutches 10, 10' are controlled by a control unit 62 of the type illustrated in FIG. 2.

Operation

Each clutch 10 according to the present invention, provides four operating conditions:

A. Forward Drive (during cornering, the overrunning wheel rolls freely and does not brake).
B. Reverse Drive (during cornering, the overrunning wheel rolls freely and does not brake).
C. Neutral (neither driving nor driveline braking is possible in either forward or reverse).
D. Driveline Braking (in straight line travel in both forward and reverse).

Operating Condition A (Forward Drive):

Referring to FIG. 2, assume that rotating shaft 24 is driven by an input shaft (not shown) in the direction of the arrow F, and carries with it the first pressure plate 12. The spring 52 biases the plunger 56 into its deactivated position, i.e., the fork 48 is in contact with the first pressure plate 12 and withdrawn from the stop lug 38, so that the fork 48 can move past the stop lug 38. The first pressure plate 12 moves tangentially by itself until the right flanks 26R of the teeth 26 make contact with the left flanks 32L of the teeth 32 of the second pressure plate 14. Due to the inclination of the flanks 26R and 32L, the tangential force is resolved into axial and radial components. The axial component produces an axial motion of the second pressure plate 14 to compress the disk package 16 and the support cup 40. Positive or friction locking then occurs in the clutch 10, with the result that the driven component 44 moves in the same direction as the rotating shaft 24.

The axial force generated by the axial movement of the second pressure plate 14 is sensed by the pressure sensor 70 and transmitted through the control line 78 to the control unit 62. There, a control impulse is generated to move the plunger 46 towards the second pressure plate 14, so that the fork 48 is moved into the path of the stop lug 38.

When the tractor begins cornering above a certain angle (and assuming that the clutch 10 shown in the drawing is associated with the outer wheel in cornering), the driven component 44 and the second pressure plate 14 connected to it will rotate more rapidly in the direction F than the rotating part 24 and the first pressure plate 12. As a result, the flanks 26R and 32L will lose contact, and, with increasing rotational speed difference, the flanks 26L and 32R will approach each other. If they actually made contact, they would effect a locking engagement, which would apply driveline braking to the driven component 44. Instead, before the flanks 26L and 32R make contact, the fork 48 of the now extended plunger 46 will engage the stop lug 38 and prevent any further relative motion between pressure plates 12 and 14. As a result, the sloped faces of the teeth 26, 32 will not engage, no axial forces will be generated, and the overrunning wheel will continue to run freely.

Operating Condition B (Reverse Drive):

The travel direction sensor 66 is actuated upon a change in direction of travel of the tractor. The control unit 62 then temporarily stops applying current to the magnet 54. The plunger 46 will move away from the second pressure plate 14 by virtue of the spring 52, and will retract from the line of travel of the stop lug 38. The same operation then proceeds as in forward travel, except that now the drive is in the direction of the arrow R, so that the designations of the flanks 26L, 26R, 32L and 32R are reversed correspondingly.

Operating Condition C (Neutral):

The control unit 62 will shift from operating condition A (forward drive) or operating condition B (reverse drive) to operating condition C (neutral) when the main switch 80 is flipped into the appropriate position. The control unit 62 then will transmit a control impulse to the magnet 54 with the result that the fork 48 of the plunger 46 will engage the stop lug 38. This will connect the first and second pressure plates 12 and 14 to each other. To ensure that the fork 48 positively engages the stop lug 38 without fail, the opening of the fork 48 may be V shaped and the stop lug 38 may be pointed, so that the stop lug 38 will slip into the fork 48 with only a small tangential offset of the two pressure plates 12, 14. Alternatively, the stop may frictionally engage the stop lug.

After both pressure plates 12, 14 have been connected with each other, the teeth 26 and 32 can no longer make contact with each other and hence neither driving nor braking can occur.

Operating Condition D (Driveline Braking):

Regardless of the operating condition A, B or C existing at the time, operating condition D automatically is actuated when the steering angle sensors detect straight line travel (or straight line travel within certain limits) and the brakes are applied. The control unit 62 then interrupts the current to the magnet 54, so that the plunger 46 is moved out of the path of the stop lug 38 by means of the spring 52. When the brakes are applied, the pressure plate 14 will overrun pressure plate 12, so that teeth 26 and 32 will disengage. This time, however, the plunger 46 of the stop 18 is not extended, so the stop 18 will not prevent re-engagement of the teeth 26 and 32 in the opposite direction. Accordingly, the clutches 10, 10' will transmit power and the entire drive line will be under load, with the result that these selectively engageable front wheels 86, 86' will provide engine/driveline braking in addition to the engine/driveline braking through the continuously driven rear wheels (not shown).

The operating condition D also is in effect when the tractor is not operating, e.g., if it is turned off or if the engine fails, since at that time there is no current flow to the magnet 54.

Optionally, an additional switch (not shown) may be provided by means of which operating condition D may be invoked manually, for example, in order to apply the brakes to the selectively engagable wheels on slippery pavement.

Other sensors may be used for the control of the stop 18 in order to sense certain other parameters. In addition, other operating conditions, either fewer or in addition to the above, may be arranged, with appropriate modification to the control unit 62.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A clutch with two pressure plates which move circumferentially relative to one another, each plate having a side facing the other plate and having contoured teeth on said side which project axially towards and are selectively engageable with the teeth of the other plate, characterized in that a stop is attached to one of the pressure plates and can selectively be brought into contact with the other pressure plate in order to stop relative motion between the two pressure plates and prevent engagement of the teeth, depending upon selected parameters.

2. The clutch according to claim 1, further characterized in that a stop lug is provided on the other pressure plate and the stop can be brought into contact with the stop lug when the pressure plates are moving in either circumferential direction of travel.

3. The clutch according to claim 2, further characterized in that the stop can engage the stop lug with either friction or positive locking.

4. The clutch according to claim 1, further characterized in that the stop can be moved between an activated position in contact with the other pressure plate and a de-activated position not in contact with the other pressure plate by a selector means selected from the group consisting of controllable magnets and valves that control pressure applied to the stop.

5. The clutch according to claim 1, further characterized in that the stop can be moved into a de-activated position not in contact with the other pressure plate by means of a spring.

6. The clutch according to claim 1, further characterized in that the stop comprises a plunger, a spring and a magnet, where the plunger can be moved in one direction by the spring and in an opposite direction by the magnet.

7. The clutch according to claim 6, further characterized in that the magnet is controlled by a control circuit means.

8. A differential system for a steerable motor vehicle having at least two clutches positioned in the drive line on either side of the differential, wherein each said clutch comprises:
   two pressure plates which move circumferentially relative to one an other to engage each other; and
   a stop attached to one of the pressure plates which can selectively be brought into contact with the other pressure plate in order to stop relative motion between the two pressure plates, said stop comprising a plunger, a spring and a magnet, where the plunger can be moved in one direction by the spring and in an opposite direction by the magnet;
and the system further comprises:
   control circuit means for controlling engagement of the stop based on parameters including the advance of an overrunning outer wheel during cornering, the steering angle, the direction of travel, the operation of a brake, and the actual operating condition of the drive.

9. A clutch for drivably interconnecting a driving shaft and a driven m ember, comprising:
   a first pressure plate mounted for rotation with the driving shaft and having a plurality of conical teeth on a first face thereof;
   a second pressure plate mounted for rotation about said driving shaft and having a plurality of conical teeth on a first face thereof facing and engageable with the teeth of said first plate, and having a substantially flat second face on the opposite side of said second pressure plate from said first face;
   a plurality of clutch disks and separators, the disks being splined for rotation with the driving shaft and the separators being splined for rotation with the driven member, the clutch disks and separators being compressible into engagement between the driven member and the second face of the second pressure plate; and
   a stop mounted on one of the pressure plates and selectively movable between a position engaging the other pressure plate to prevent relative rotation therebetween and a position disengaged from the second pressure plat to allow relative rotation therebetween.

10. The clutch of claim 9, wherein said stop comprises a plunger mounted to said one of said pressure plates and axially slidable between said positions.

11. The clutch of claim 10, wherein said stop further comprises means for moving said plunger between said positions.

12. The clutch of claim 11, wherein said means for moving said plunger comprises a spring for moving said plunger into one of said positions and a control mechanism selected from the group consisting of electromagnets and electromagnetically controlled pneumatic and hydraulic systems for moving the plunger to the other position.

13. The clutch of claim 12, further comprising slip rings on the outer circumference of the pressure plate to which said plunger is mounted for connecting said control mechanism to a control unit.

14. The mechanism of claim 10, wherein a lug is provided on the second pressure plate for engagement by the plunger.

15. The clutch of claim 14, wherein a fork is provided on the end of said plunger adjacent said second plate for engagement with said lug.

* * * * *